United States Patent [19]
Ebeling

[11] Patent Number: 5,514,305
[45] Date of Patent: May 7, 1996

[54] BUBBLE TRAY

[76] Inventor: Harold O. Ebeling, 4718 S. Lewis Ct., Tulsa, Okla. 74105

[21] Appl. No.: 526,038

[22] Filed: Sep. 8, 1995

Related U.S. Application Data

[63] Continuation of Ser. No. 263,793, Jun. 22, 1994, abandoned.

[51] Int. Cl.$^6$ ................................................. B01F 3/04
[52] U.S. Cl. ................................................. 261/114.2
[58] Field of Search ..................... 261/114.2; 285/286; 29/890.43, 890.08, 890.054; 228/60; 52/218, 219, 253, 260

[56] References Cited

U.S. PATENT DOCUMENTS

| | | | |
|---|---|---|---|
| 1,699,279 | 1/1929 | Carpenter | 29/890.08 |
| 2,147,786 | 2/1939 | Fenske et al. | 261/114.2 |
| 2,378,952 | 6/1945 | Rousseau | 261/114.2 |
| 2,422,300 | 6/1947 | Glitsch | 261/114.2 |
| 2,695,182 | 11/1954 | Folz | 285/286 |
| 3,259,402 | 7/1966 | Wyatt | 285/286 |
| 3,734,175 | 5/1973 | Christensen | 29/890.043 |
| 4,112,025 | 9/1978 | Wilson et al. | 261/DIG.47 |
| 4,207,276 | 6/1980 | Rankainen et al. | 261/114.2 |
| 4,432,779 | 2/1984 | Honerkamp et al. | 55/233 |
| 4,661,130 | 4/1987 | Ebeling et al. | 55/234 |
| 5,116,393 | 5/1992 | Ebeling | 261/114.2 |

*Primary Examiner*—Tim R. Miles
*Attorney, Agent, or Firm*—Head, Johnson & Kachigian

[57] ABSTRACT

An improved bubble tray for use in a vertically or horizontally oriented absorber, contactor or fractionation vessel for intimately contacting a gas with a liquid, the gas traveling upwardly in the vessel while the liquid flows downwardly, including a horizontal tray dividing the vessel into an upper and lower zone, the tray having a plurality of spaced apart openings, a vertical tube for each opening, the lower end of each tube being secured to the horizontal tray, a horizontal washer received on each of the tubes at a location spaced below the tube upper end and above the horizontal tray and an inverted cup for each of the tubes, each cup having a closed upper portion and a open lower end that is affixed to a washer so that a tube upper end extends within each inverted cup. Each inverted cup has spaced apart elongated vertical openings therein that cause the formation of very small gas bubbles that percolate upwardly through the downwardly flowing liquid.

5 Claims, 2 Drawing Sheets

BUBBLE TRAY

This is a continuation of application Ser. No. 08/263,793 filed on Jun. 22, 1994, now abandoned.

BACKGROUND OF THE INVENTION

In industrial processing applications, it is frequently necessary to contact gas with liquid such as, by example, contacting natural gas with glycol as a means of extracting entrained water from the natural gas. Contacting a gas with a liquid is involved in processes of fractionation, absorption, stripping, regeneration and so forth. Apparatuses for contacting a gas with a liquid are used in gas treatment systems, petroleum refining, petrochemical manufacturing and other industries.

This invention relates to an improved bubble tray for use in a vessel to achieve more effective and intimate contact between an upwardly flowing gas stream and a downwardly flowing liquid stream. The device of this invention is sometimes referred to in industry as a "bubble tray" since it is the intent of the device to cause upward movement of gas in the form of very small bubbles flowing countercurrent to downwardly migrating liquid to thereby achieve the most intimate contact of gas molecules with liquid molecules.

Examples of the use of bubble trays are illustrated in U.S. Pat. Nos. 4,661,130 and 4,432,779.

SUMMARY OF THE INVENTION

This invention relates to an apparatus for causing intimate contact between an upwardly flowing gas stream in a vessel with downwardly flowing liquid. The apparatus is used in conjunction with a vertically or horizontally oriented vessel and includes a horizontal tray dividing the vessel into upper and lower portions.

The lower portion of the tray has a plurality of spaced apart relatively small diameter openings. A vertical tube is affixed to the tray for each of the openings. Each tube has an upper end and a lower end, the lower end being attached to the tray in communication with an opening.

A horizontal washer is received on each of the tubes at a location spaced below the tube upper end and above the horizontal tray.

A bubble cap is supported by each of the tubes. Each bubble cap has a closed upper portion and an open lower end, the lower end being affixed to a washer so that a tube upper end extends within each of the bubble caps. Each bubble cap has spaced apart openings therein that are positioned above the bubble cap lower end and below the tube upper end.

In a preferred arrangement, the vessel upper portion forms a contactor portion, the contactor portion extending upwardly from the bubble caps. Packing is positioned within the vessel contactor portion. In operation, the vessel upper portion, including the portion having the packing therein, is filled with downwardly migrating liquid. Gas flows into the vessel lower portion, upwardly through the tubes and out through the bubble caps. The openings in the bubble caps cause the gas to form very small bubbles that upwardly migrate through the packing and through the downwardly migrating liquid. The small bubbles result in intimate contact of the upwardly flowing gas with the downwardly migrating liquid in the vessel contactor portion.

In another preferred embodiment, a clean out opening is provided in the vessel sidewall immediately above the horizontal tray and below the bubble caps to provide a means of washing the area between the bubble caps and the tray.

A more complete understanding of the invention will be obtained from the following description of the preferred embodiments and the claims, taken in conjunction with the attached drawings.

BRIEF DESCRIPTION OF THE DRAWINGS

FIG. 1 is intended to illustrate a typical application of the improved bubble tray of this invention, it being understood that the invention is not related to the specific environment in which the bubble tray is employed.

FIG. 2 shows the top view of a plurality of bubble caps that are employed in the improved bubble tray. FIG. 2 does not show packing so as to more clearly show the arrangement of the bubble tray.

DESCRIPTION OF THE PREFERRED EMBODIMENTS

Figure 1:
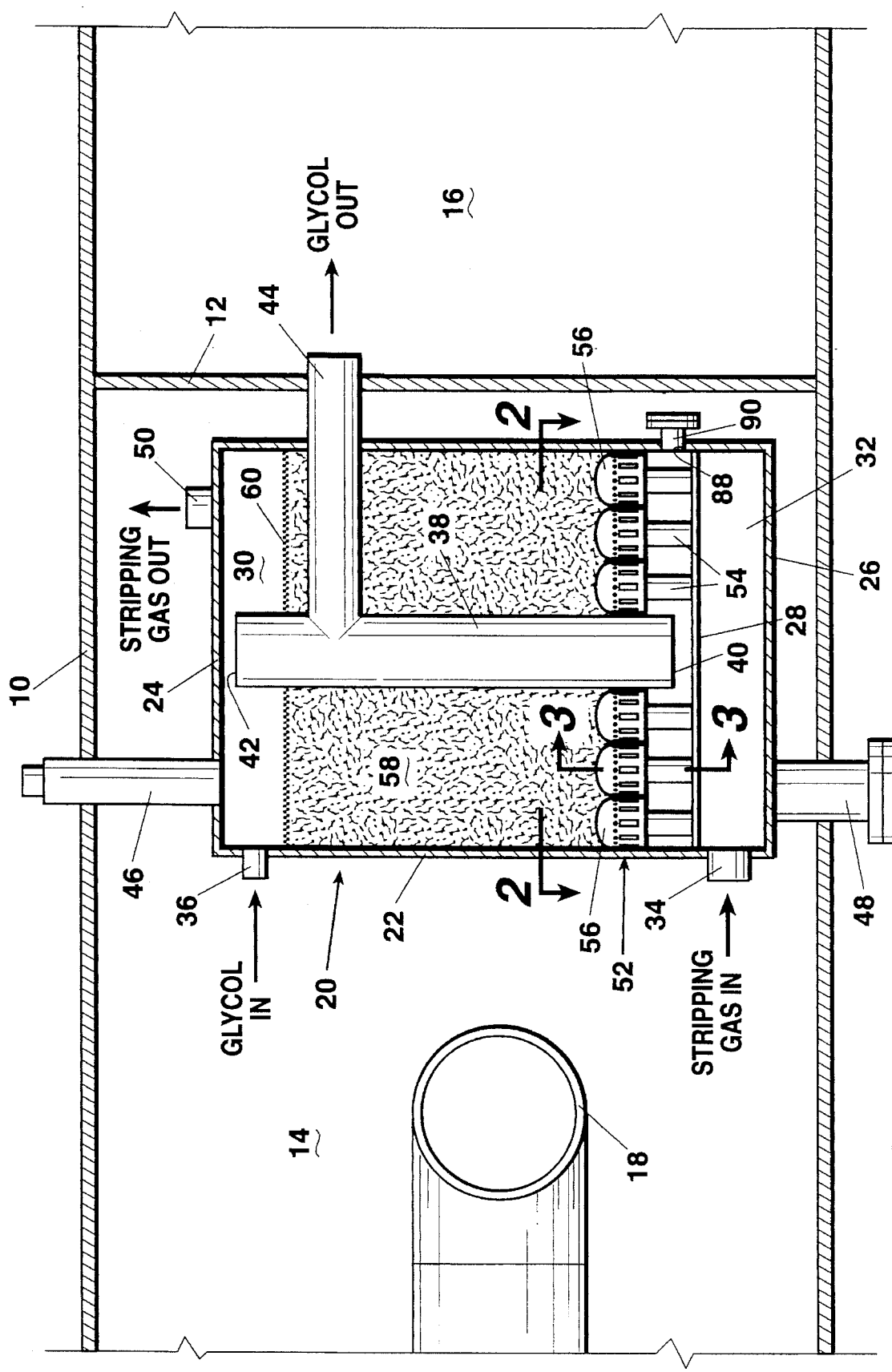
FIG. 1 is an elevational side view of a reboiler that can be employed in a gas dehydration system, the reboiler being used to extract, that is, boil off water that is entrained by a desiccant such as ethylene, diethylene or triethylene glycol. Positioned in the reboiler is a gas stripper vessel that includes, as a part thereof, the improved bubble tray of this invention.

FIG. 1 illustrates an environment in which the improved bubble tray of this invention can be employed, it being understood that FIG. 1 is for the purpose only of showing the manner in which the bubble tray functions and is not intended to limit the area of application of the improved bubble tray. FIG. 1 shows a portion of a horizontal reboiler vessel 10 divided by a vertical wall 12 into a heating section 14 and a glycol collection section 16. Positioned within heating section 14 is a heater 18 through which hot gas is passed, that is, in which gas is combusted to generate heat to heat liquid within heating section 14. Heater 18 is typical of reboilers as used for regenerating glycol in a typical gas dehydrating system.

Positioned within reboiler 10 is a vertically oriented gas stripper vessel 20. Vessel 20 is cylindrical, but it could be rectangular or other cross-sectional shape. Vessel 20 has a vertical side wall 22, a top 24 and a bottom 26. A horizontal tray 28 divides the interior of the vessel into an upper zone 30 and a lower zone 32. A stripping gas inlet 34 communicates with lower zone 32. A glycol inlet 36 communicates with upper zone 30.

A vertical glycol conduit 38 has an open lower end 40 that is spaced adjacent to, that is, slightly above, horizontal tray 28, and a closed upper end 42 that is adjacent to the top 24 of gas stripper vessel 20. A horizontal glycol outlet conduit 44 communicates with vertical glycol conduit 38. Glycol outlet conduit 44 passes through vessel vertical wall 12 and communicates with reboiler glycol collection section 16.

Gas stripper vessel 20 is provided with an upper clean out 46 and a lower clean out 48, both of which are normally closed and are not concerned with fluid or gas flow that takes place during processing operations.

In the normal processing system wherein glycol is used to extract water from a gas stream, such as natural gas, heated glycol passes into gas stripper vessel 20 through glycol inlet 36 and flows out through horizontal outlet conduit 44. Stripper gas passes into the gas stripper vessel through inlet 34 and flows out through a gas outlet 50. The piping utilized for passing stripping gas to inlet 34 and for conveying stripping gas out of reboiler 10 is not shown.

The essence of this invention is the improved bubble tray, generally indicated by the numeral 52. The improved bubble tray is formed integrally with horizontal tray 28 and includes a plurality of vertical tubes 54. Each vertical tube 54 is attached at its lower end to horizontal tray 28 and communicates with an opening through the tray in a manner that will be described subsequentially. Supported at the upper end of each of the vertical tubes 54 is a bubble cap 56. The arrangement of the horizontal tray 28, vertical tubes 54 and bubble caps 56 will be described in detail subsequentially.

Positioned within the stripper vessel upper zone 30 is packing 58. Packing 58 may include pool rings, saddles, ceramic balls, or other types of a wide variety of materials commonly employed for such purpose as is known to practitioners of the chemical processing art. A screen 60 is positioned on top of packing 58 to aid in the distribution of glycol as it enters the upper portion of upper zone 30. While not shown, a similar screen can be positioned on top of the bubble caps 56 since packing 58 is preferably maintained in the zone above the bubble caps.

Figure 2:
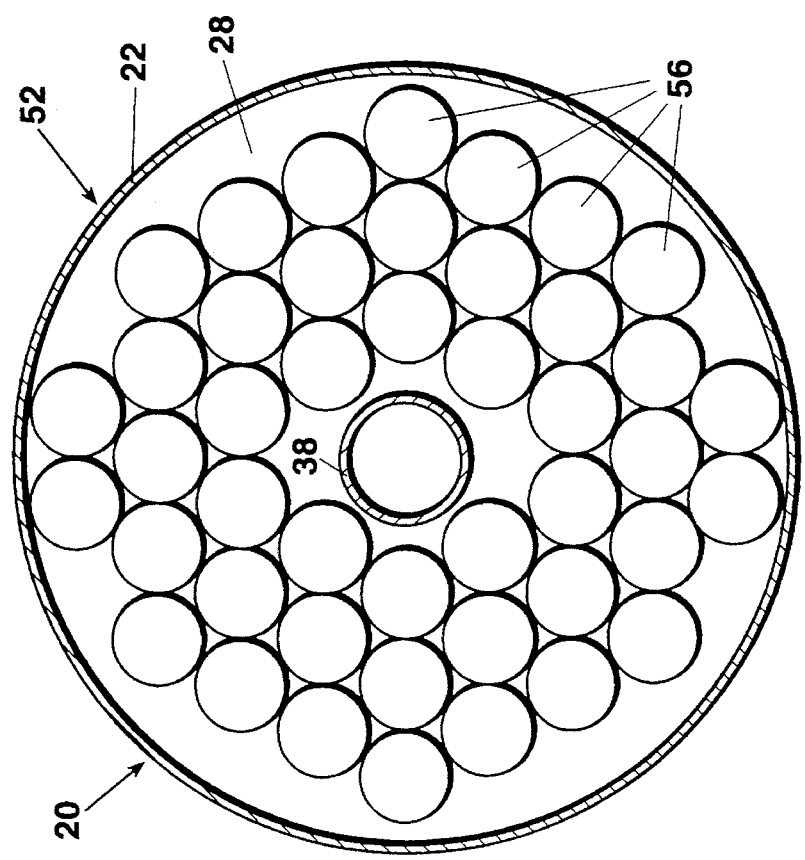
FIG. 2 is a horizontal cross-sectional view of the vessel as taken along the line 2—2 of FIG. 1.

Referring to FIG. 2, a horizontal cross-sectional view of gas stripper vessel 20, the plurality of bubble caps 56 is shown. FIG. 2 does not show the packing that has been discussed with reference to FIG. 1 so as to more clearly show the arrangement of the bubble caps. Bubble caps 56 are supported on horizontal tray 28, and in the preferred arrangement, as many as possible of the bubble caps 56 are employed. That is, they can be spaced contiguous to each other as illustrated in FIG. 2 or slightly separated, but to achieve the maximum performance of the improved bubble tray 52, the bubble caps are nestled together to achieve the maximum number of bubble caps available for the cross-sectional area of tray 28. Glycol conduit 38 is also seen in FIG. 2.

Figure 3:
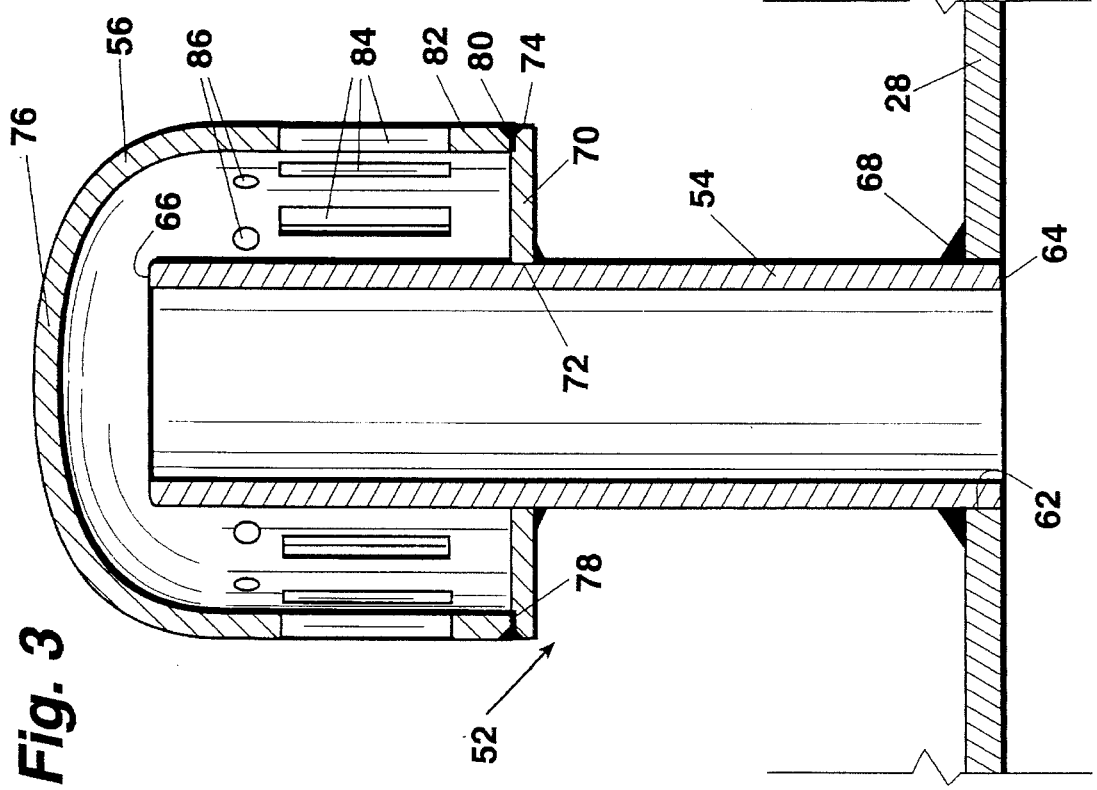
FIG. 3 is an enlarged cross-sectional view taken along the line 3—3 of FIG. 1. This view shows the arrangement of a tube and bubble cap supported to a horizontal tray.

FIG. 3 shows the detailed arrangement of a bubble cap as it is supported on a horizontal tray 28. As previously stated, there is an opening 62 in horizontal tray 28 for each vertical tube 54.

Vertical tube 54 has a lower end 64 and an upper end 66. The portion adjacent the lower end 64 of each vertical tube 54 is secured to horizontal tray 28, such as by welding 68, although it can be seen that if opening 62 was threaded (not illustrated) tube 54 could be threaded into it.

Received on each vertical tube 54 is a washer 70. More specifically, a washer 70 having a central opening 72 therein is received on each vertical tube 54 and spaced below the tube upper end 66 and above horizontal tray 28. Each washer 70 has an outer peripheral surface 74. Supported on each washer 70 is a bubble cap 56. Each bubble cap has a closed upper end 76 and an open cylindrical bottom end 78. The bottom end of each bubble cap is secured to the peripheral surface 74 of a washer 70, such as by welding 80 as illustrated. Formed in the tubular side wall 82 of each bubble cap 56 are a plurality of openings. In the illustrated arrangement, the openings include vertical spaced apart elongated slots 84 and small diameter openings 86. The preferred arrangement of the bubble caps 56 is that each has a plurality of spaced apart narrow vertical slots 84, however, the use of the smaller diameter openings 86 is optional. Vertical slots 84 are formed in each bubble cap side wall 82 below tube upper end 66.

The improved bubble tray of this invention functions in an improved manner by generating a mass of very small bubbles of gas that migrate upwardly in the fluid that saturates packing 58, as shown in FIG. 1, the upward gas migration being countercurrent to the downward migration of liquid in the packing. The large number of small diameter bubbles is achieved by the improved bubble tray of this invention due to the configuration of the bubble caps as they are supported on elongated vertical tubes 54 and with each bubble cap having a plurality of vertical narrow slots 84. The vertical narrow slots are preferably about ¼" wide or narrower and are spaced apart approximately ½" or less. That is, in the most preferred arrangement, a large number of slots 84 are employed and the slots are spaced closely together.

The arrangement of the improved bubble tray 52 results in more intimate contact of gas with liquid for processing purposes.

As shown in FIG. 1, there is formed in the side wall 22 of gas stripper vessel 20 a clean out opening 88 that communicates with a short-length conduit 90 that is normally closed as illustrated. The purpose of clean out opening and conduit 90 is to permit the upper surface of the horizontal tray 28, below bubble caps 56 to be cleaned, such as by flushing with water or a cleaning fluid.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved contactor for exposing gas to a liquid comprising:

an upright vessel having an upper portion and a lower portion and a vertical sidewall;

a horizontal tray dividing said vessel upper and lower portions, the tray having a plurality of spaced apart openings therein;

a vertical tube affixed to said tray for each of said openings, each tube having an upper and a lower end, each lower end communicating with a said opening;

a horizontal washer received on each of said tubes at a location spaced below said tube upper end and above said tube lower end;

a bubble cap for each of said tubes, each bubble cap having a closed upper portion and an open lower end that is affixed to a said washer so that a said tube upper end extends within each said bubble cap, each bubble cap having spaced apart openings therein positioned above said bubble cap lower end and below said tube upper end whereby gas may flow upwardly through said tubes and out through said bubble cap openings, said bubble caps being spaced above said tray, the gas flowing out through said bubble cap openings as small bubbles;

means for introducing liquid into and withdrawing gas from said vessel upper portion, the liquid migrating downwardly within said vessel to below said bubble caps; and means for introducing gas into said vessel lower portion below said horizontal tray and for upwardly withdrawing liquid from a point within said vessel above said horizontal tray and below said bubble caps.

2. An improved contactor for exposing gas to a liquid according to claim 1 wherein said vessel has a clean out opening in said vertical sidewall immediately above said tray and below said bubble caps.

3. An improved contactor according to claim 1 wherein at least some of said openings in each of said bubble caps are elongated and vertical.

4. An improved contactor for exposing gas to liquid according to claim 1 including:

a contact portion within said vessel upper portion, the contact portion extending upwardly from said bubble caps; and packing within said vessel contact portion, the packing being filled with said liquid through which said small bubbles upwardly percolate to intimately contact said liquid.

5. An improved contactor for exposing gas to a liquid comprising:

an upright vessel having an upper portion and a lower portion and a vertical sidewall;

a horizontal tray dividing said vessel upper and lower portions, the tray having a plurality of spaced apart openings therein;

a vertical tube in the form of a short length of pipe affixed to said tray for each of said openings, each tube having an upper and a lower end, each lower end being welded to said tray in communication with a said opening;

a horizontal washer received on and welded to each of said tubes at a preselectable location spaced a preselectable distance below said tube upper end and above said tube lower end;

a bubble cap for each of said tubes, each bubble cap having a closed upper portion and an open lower end that is welded to a said washer so that a said tube upper end extends within each said bubble cap, each bubble cap having spaced apart vertically aligned openings therein positioned above said bubble cap lower end and below said tube upper end whereby gas may flow upwardly through said tubes and out through said bubble cap openings, said bubble caps being spaced above said tray, the gas flowing out through said bubble cap openings as small bubbles;

means for introducing liquid into and withdrawing gas from said vessel upper portion, the liquid migrating downwardly within said vessel to below said bubble caps; and means for introducing gas into said vessel lower portion below said horizontal tray and for upwardly withdrawing liquid from a point within said vessel upper portion above said horizontal tray and below said bubble caps.

* * * * *